United States Patent
Seagren et al.

(10) Patent No.: US 9,948,110 B2
(45) Date of Patent: Apr. 17, 2018

(54) POWER DISTRIBUTION SYSTEM

(75) Inventors: Robert L. Seagren, Rockford, IL (US);
Joshua Berg, Rockford, IL (US);
Dennis Strong, Hampshire, IL (US);
Jomar Avancini Rocha, Machesney Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1676 days.

(21) Appl. No.: 13/476,377

(22) Filed: May 21, 2012

(65) Prior Publication Data
US 2013/0307337 A1   Nov. 21, 2013

(51) Int. Cl.
*H02J 4/00* (2006.01)
*H02J 9/06* (2006.01)

(52) U.S. Cl.
CPC ............... *H02J 4/00* (2013.01); *H02J 9/06* (2013.01); *Y10T 307/505* (2015.04)

(58) Field of Classification Search
CPC ............. Y10T 307/313; Y10T 307/344; Y10T 307/391; Y10T 307/50; Y10T 307/615; Y10T 307/647; Y10T 307/76; Y10T 307/766; Y10T 307/826; Y10T 307/832; Y10T 307/937; Y10T 307/944; Y10T 307/957; H02J 1/10; H02J 9/061; H02J 3/382; G06F 1/26; G06F 1/263; H01H 2009/267
USPC .......................................................... 307/80
See application file for complete search history.

(56) References Cited

U.S. PATENT DOCUMENTS

| | | | |
|---|---|---|---|
| 2,860,721 A | 11/1958 | Hassan | |
| 4,321,645 A | 3/1982 | Thom et al. | |
| 4,403,292 A * | 9/1983 | Ejzak et al. | 700/297 |
| 4,758,167 A | 7/1988 | Bepoix | |
| 5,739,594 A * | 4/1998 | Sheppard | H02J 9/06 307/126 |
| 5,939,802 A * | 8/1999 | Hornbeck | H02J 1/10 307/64 |
| 5,977,645 A | 11/1999 | Glennon | |
| 6,097,108 A * | 8/2000 | Tweed | H02J 3/14 307/31 |
| 6,145,308 A * | 11/2000 | Bueche | F04B 49/002 60/398 |
| 6,664,656 B2 | 12/2003 | Bernier | |
| 7,622,821 B2 | 11/2009 | Mehrer et al. | |
| 8,050,069 B2 | 11/2011 | Karipides et al. | |
| 2005/0034464 A1* | 2/2005 | Gonzalez | F02C 3/20 60/801 |
| 2007/0018506 A1* | 1/2007 | Paik et al. | 307/115 |
| 2008/0054722 A1* | 3/2008 | Phelps | H02J 9/061 307/64 |

(Continued)

FOREIGN PATENT DOCUMENTS

| EP | 1973214 | 9/2008 |
|---|---|---|
| EP | 2408085 | 1/2012 |
| FR | 2900637 | 11/2011 |

*Primary Examiner* — Thienvu Tran
*Assistant Examiner* — David M Stables
(74) *Attorney, Agent, or Firm* — Carlson, Gaskey & Olds, P.C.

(57) ABSTRACT

An example power distribution system includes a relay moveable to a position that holds at least one contactor closed. The relay is moved to the position in response to an alternate source powering a power distribution system rather than a main source powering the power distribution system.

14 Claims, 7 Drawing Sheets

(56) References Cited

U.S. PATENT DOCUMENTS

| | | |
|---|---|---|
| 2010/0039741 A1 | 2/2010 | Booth et al. |
| 2010/0141038 A1* | 6/2010 | Chapel et al. .................. 307/64 |
| 2010/0204848 A1 | 8/2010 | Botura et al. |
| 2011/0057514 A1* | 3/2011 | Lathrop et al. ................ 307/64 |
| 2011/0315815 A1* | 12/2011 | Finney ................ B64D 41/007 244/58 |
| 2012/0013177 A1* | 1/2012 | Krenz ...................... H02J 4/00 307/9.1 |

\* cited by examiner

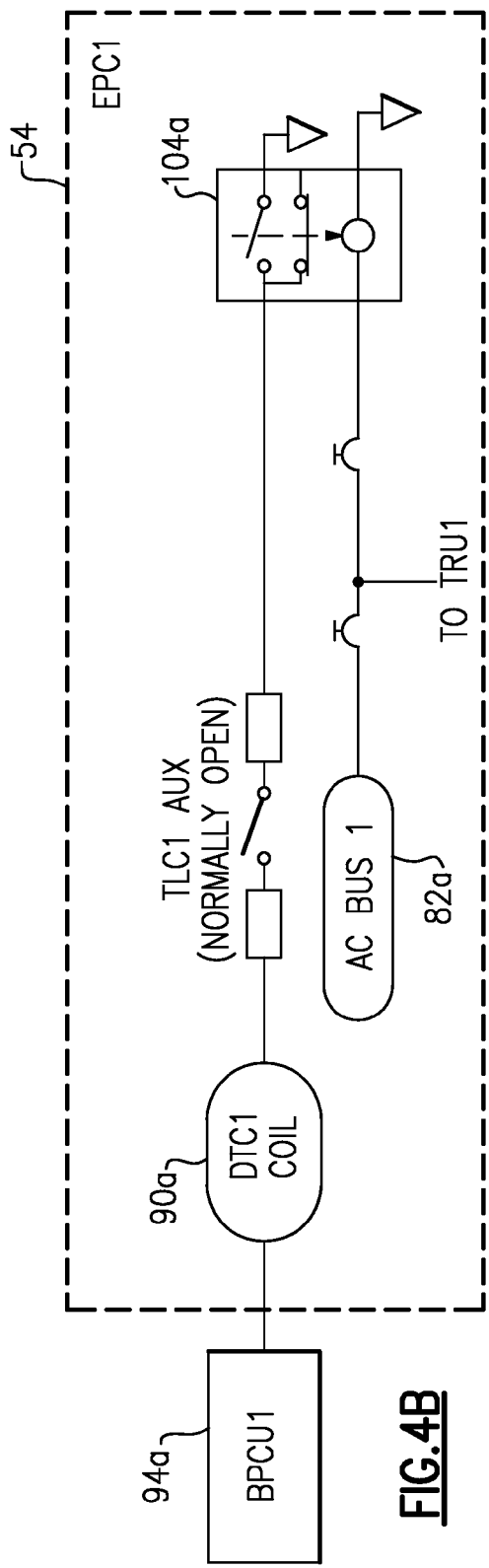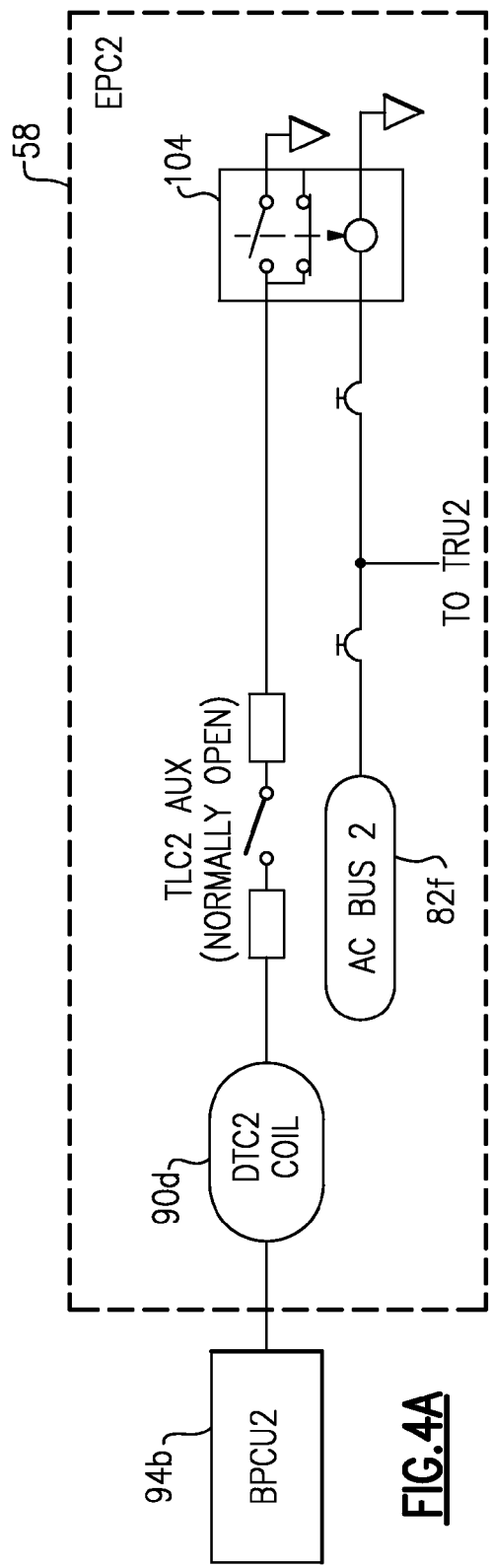

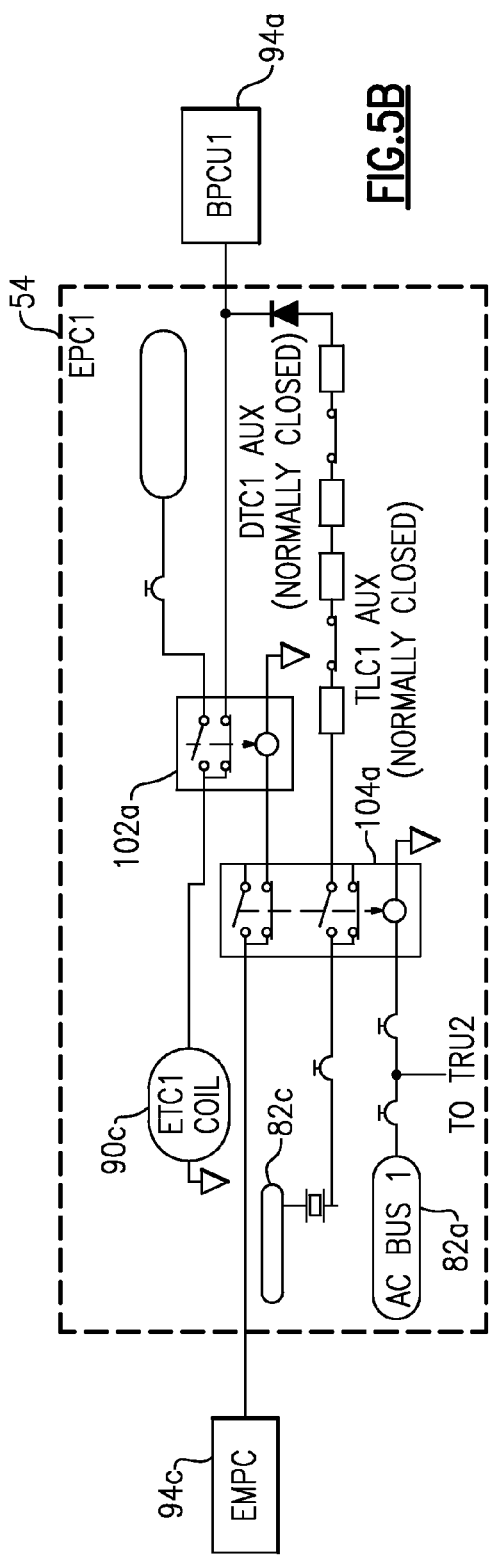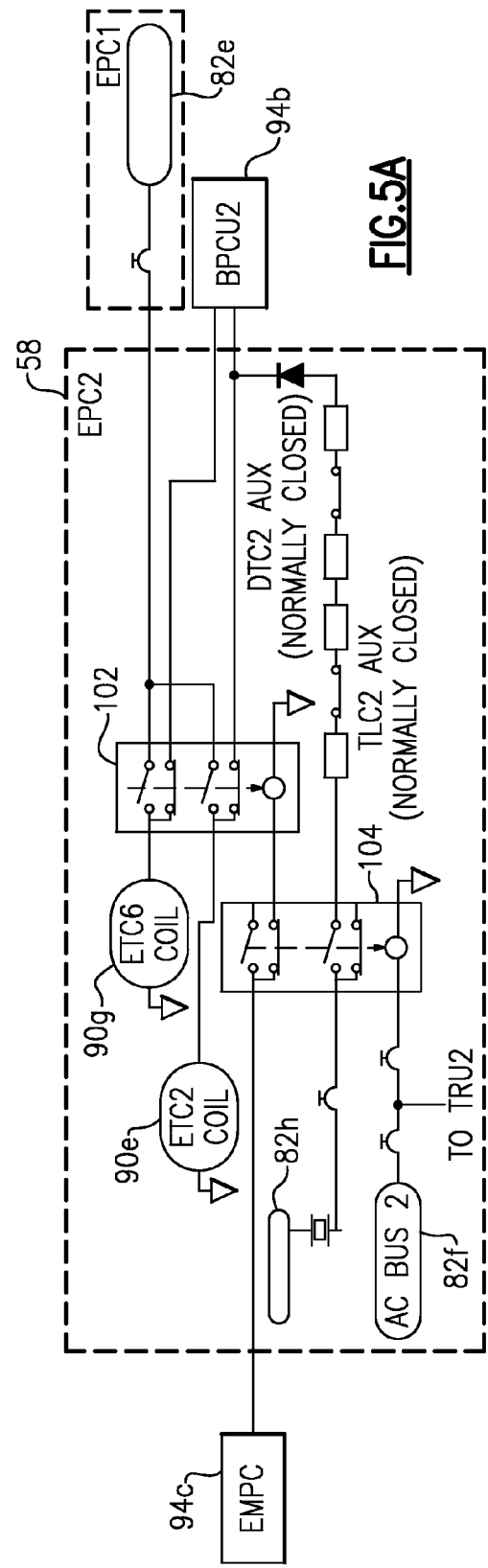
FIG.5B
FIG.5A

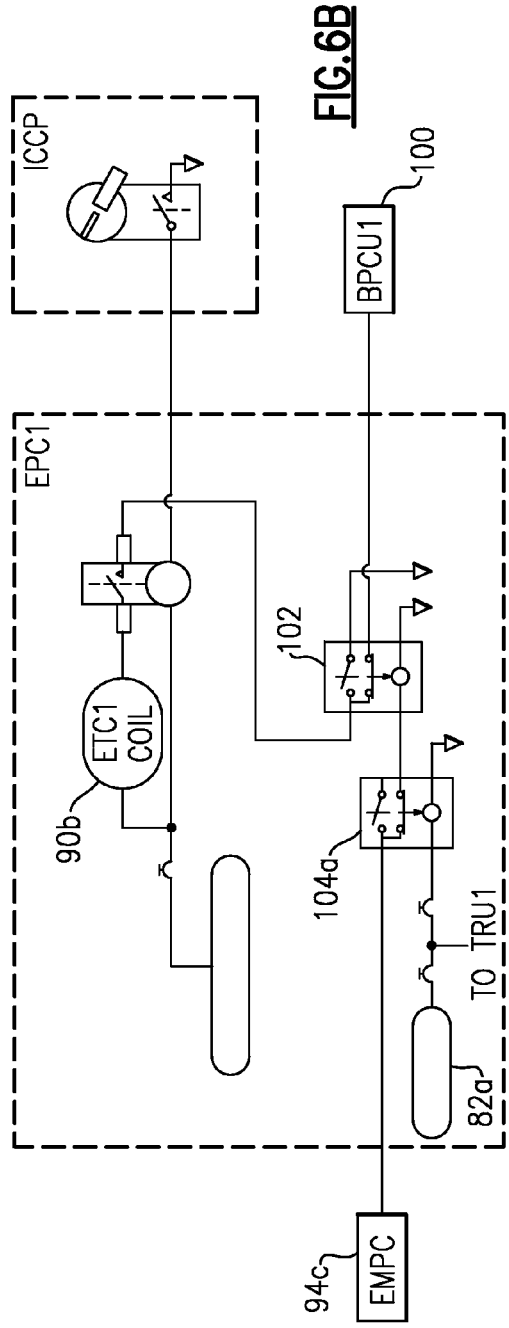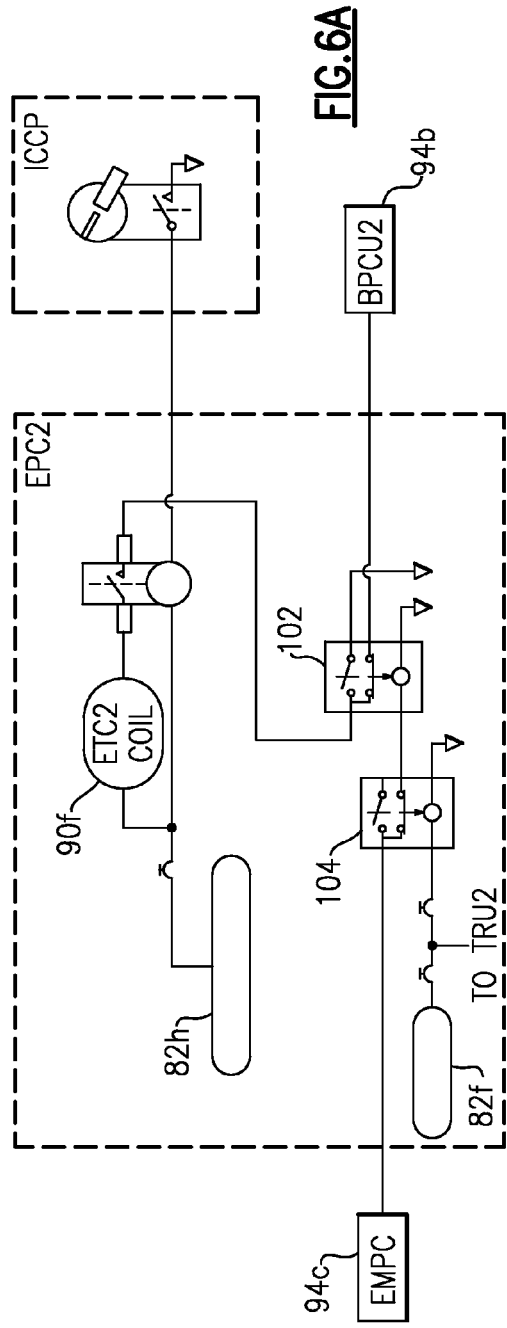

POWER DISTRIBUTION SYSTEM

BACKGROUND

This disclosure relates generally to an electrical primary power distribution system and, more particularly, to separation between main (or also called normal) power distribution system and auxiliary (or also called alternate) power distribution systems. This provides a means to meet aircraft certification requirements around the separation and independence of these systems.

Main power sources power main power distribution system. Alternate power sources power alternate power distribution system. Alternate power distribution systems are used if, for example, the main power distribution system fails. Main power distribution systems and alternate power distribution systems may share components, such as contactors.

Aircraft certification requirements require separation between main power distribution systems and alternate power distribution systems. Aircraft power distribution systems, for example, often require such separation. Using a controller to separate shared components may not meet separation requirements.

SUMMARY

An example of a power distribution system includes a relay moveable to a position that holds at least one contactor closed. The relay is moved to the position in response to an alternate source powering a power distribution system rather than a main source powering the power distribution system.

An example of an aircraft power distribution system includes a plurality of power busses configured to selectively receive power from a main power source or an alternate power source. A controller moves a contactor between an open position and a closed position when one of the power buses receives power from the main power source. The contactor is held in the closed position when one of the power buses receives power from the alternate power source.

An example method of distributing power includes selectively powering a bus with a main power source or an alternate power source, and permitting movement of contactors between open and closed positions when the main power source provides power. The method holds the contactors closed when the alternate power source provides power.

DESCRIPTION OF THE FIGURES

The various features and advantages of the disclosed examples will become apparent to those skilled in the art from the detailed description. The figures that accompany the detailed description can be briefly described as follows:

FIG. 4A shows a detailed schematic view of a portion of the panel of FIG. 3A.

FIG. 4B shows a detailed schematic view of a portion of the panel of FIG. 3B.

FIG. 5A shows a detailed schematic view of a portion of the panel of FIG. 3A.

FIG. 5B shows a detailed schematic view of a portion of the panel of FIG. 3B.

FIG. 6A shows a detailed schematic view of a portion of the panel of FIG. 3A.

FIG. 6B shows a detailed schematic view of a portion of the panel of FIG. 3B.

DETAILED DESCRIPTION

Figure 1:
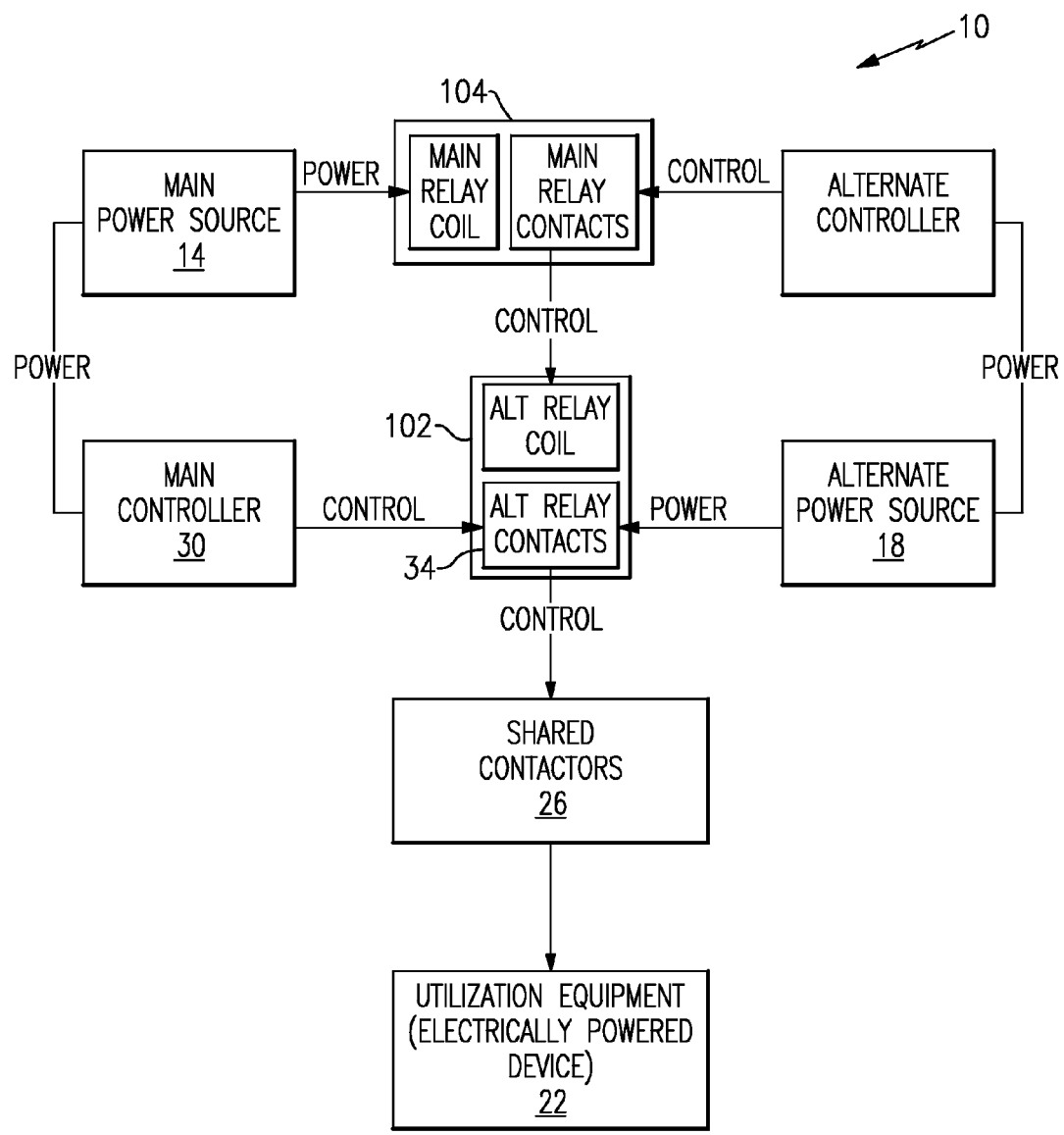
FIG. 1 shows a highly schematic view of an example power distribution system.
Figure 2:
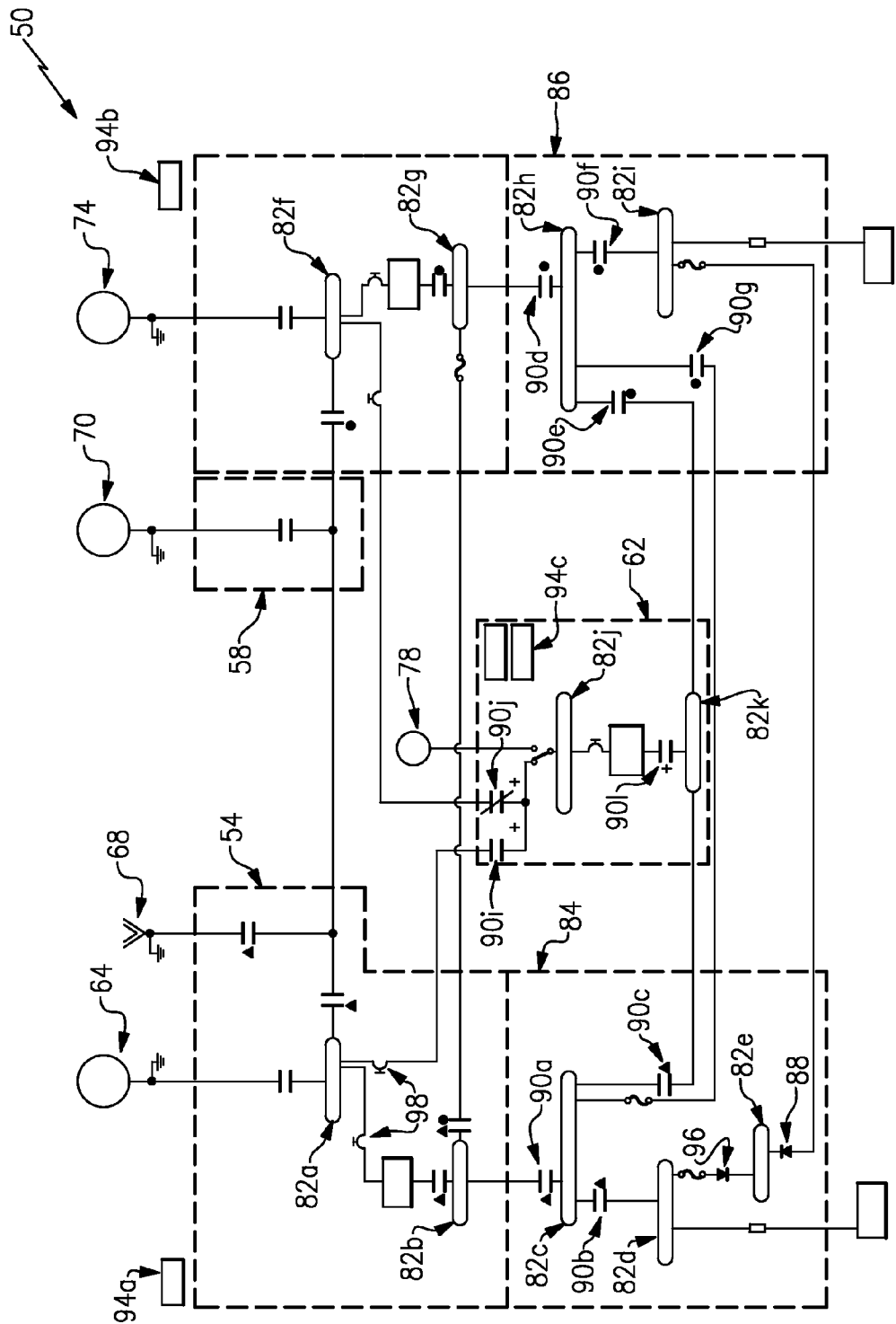
FIG. 2 shows a detailed schematic view of another example power distribution system for an aircraft.
Figure 3A:
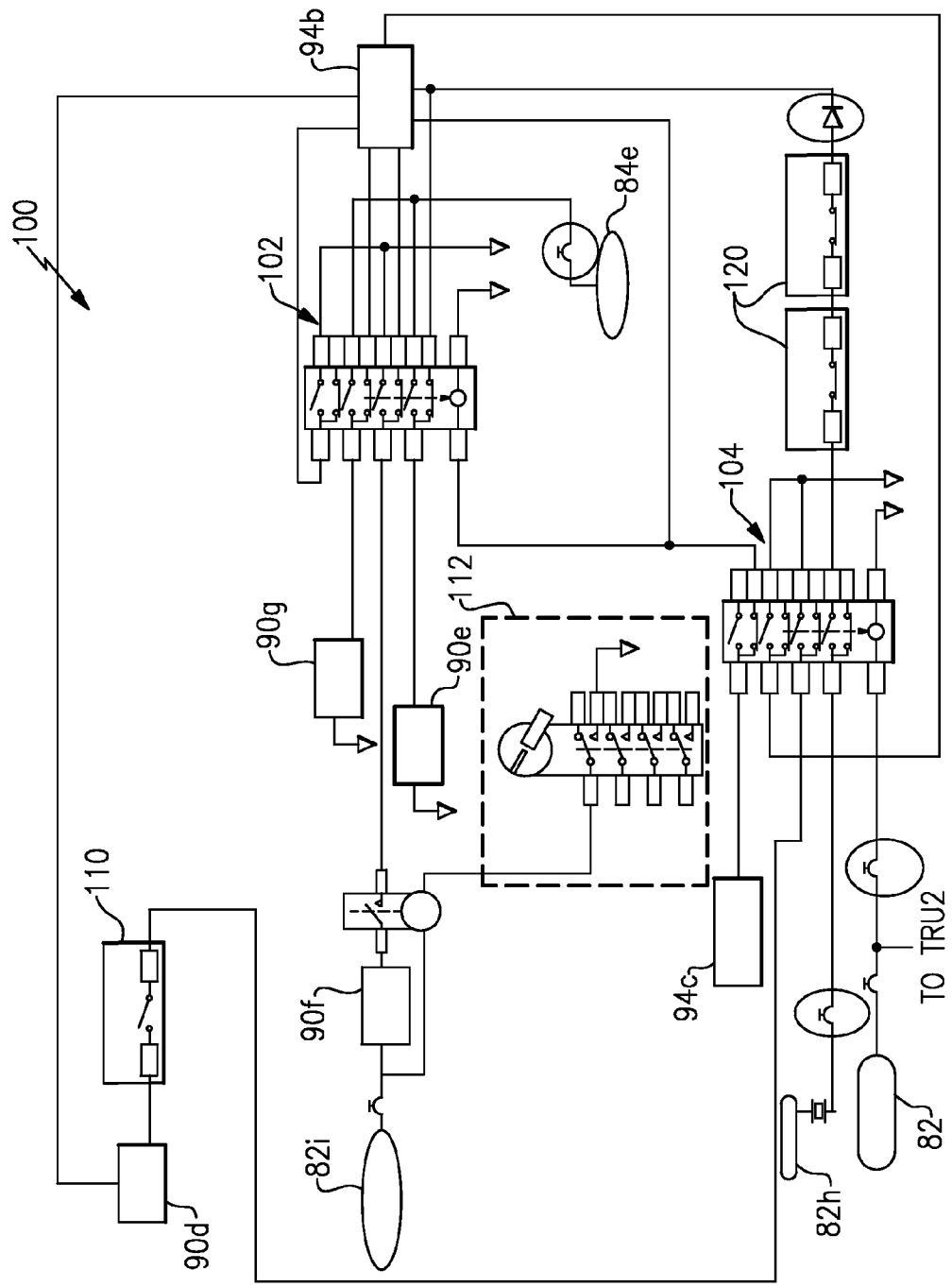
FIG. 3A shows a detailed schematic view of a panel within the power distribution system of FIG. 2.
Figure 3B:
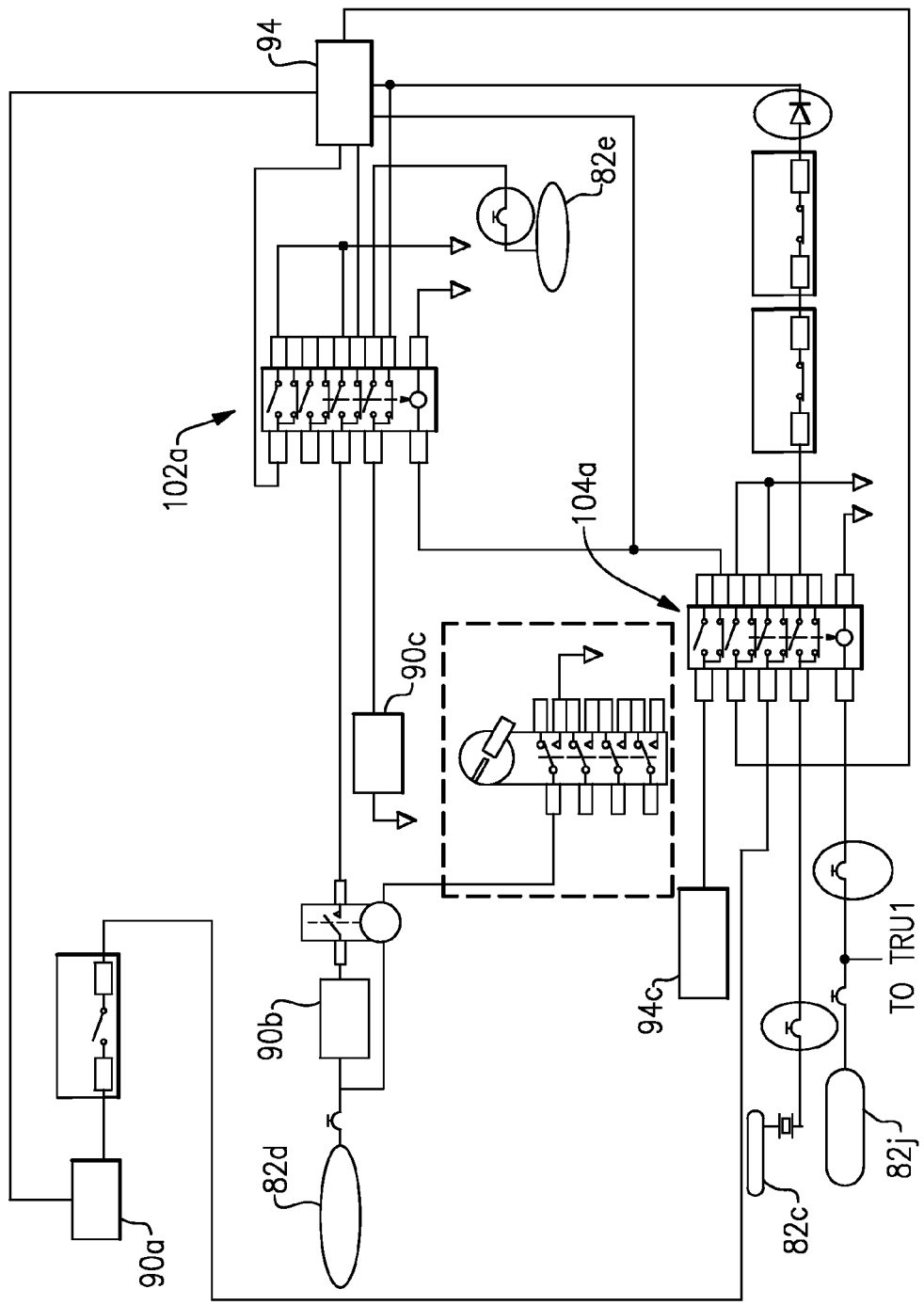
FIG. 3B shows a detailed schematic view of another panel within the power distribution system of FIG. 2.

Referring to FIG. 1, an example electrical power distribution system 10 includes a main power source 14 and an alternate power source 18. The main power source 14 and the alternate power source 18 selectively provide power to an electrically powered device 22 utilizing shared contactors 26.

The power distribution system 10 could be used in many environments, such as onboard an aircraft. The electrically powered device 22 could be many devices, such as systems of the aircraft requiring power during normal operation and abnormal operation.

Only one of the main or alternate power sources 14 and 18 provides power to the electrically powered device 22 at any one time. When the main power source 14 provides power, a controller 30 is used to control power delivery and, more specifically, to open and close the shared contactors 26. A relay 34 is closed when the main power source 14 is used, which allows the controller 30 to control the shared contactors 26. The main controller 30 selectively opens and closes individual ones of the shared contactors 26 to efficiently deliver power to the electrically powered device.

During abnormal operation of the power distribution system 10, the alternate power source 18 is used to deliver power instead of the main power source 14. When the alternate power source 18 is used, the relay 34 is opened, which prevents the controller 30 from selectively activating, or having any control over, the shared contactors 26. In this example, the relay 34 moves from closed to open in response to the alternate power source 18 powering the power distribution system 10 rather than the main electrical supply 14 powering the power distribution system 10.

The power distribution system 10 thus provides full control of the shared contactors 26 using the controller 30 when the main power source 14 is providing power. When the alternate power source 18 provides power, such as during an electrical emergency condition (lost of normal power sources), the controller 30 is effectively disengaged from the shared contractors 26 and power is supplied to device 22 by the alternate power source 18, via closed contactors 26.

Referring to FIGS. 2 to 6B, an example power distribution system 50 is used on an aircraft. The example power distribution system 50 generally includes a first electrical power panel 54, a second electrical power panel 58, and a third electrical power panel 62.

The system 50 includes a first main power source 64, a second main power source 68, a third main power source 70, and a fourth main power source 74. In this example, the first main power source 64 and the fourth main power source 74 are the main engines of the aircraft. The second main power source 68 represents a power source that is external to the aircraft. The third main power source 70 is an auxiliary power unit.

The system 50 also includes first alternate power source 78, which is a hybrid ram air turbine in this example. The main power sources 64, 68, 70, and 74 and the alternate power source 78 are configured to deliver power to one or more busses 82a to 82k of the power distribution system 50. Electrically powered devices of the aircraft draw power from one or more of the busses 82a to 82k. Cabin lights, for example, may draw power from one of the busses 82a to 82k.

In this example, the bus 82c is a DC essential bus, the bus 82d is a battery direct bus, and the bus 82e is an emergency bus. Each of the busses 82c, 82d, and 82e are located within an alternate system portion 84 of the first electrical power panel 54. The alternate system portion 84 of the first electrical power panel 54 includes contactors 90a to 90c that are selectively controlled by a first main controller 94a of the system 50 under normal operation. The contactors 90a to 90c include coils. The contactors 90a to 90c are a type of electrically controlled switches.

In this example, the bus 82h is a DC essential bus and the bus 82i is a battery direct bus. The busses 82h and 82i are located within an alternate system portion 86 of the second electrical power panel 58. The alternate system portion 86 of the second electrical power panel 58 includes contactors 90d to 90g that are selectively controlled by a second main controller 94b of the system 50 under normal operation.

In this example, the bus 82j is an AC essential bus and the bus 82k is a DC essential bus. The busses 82j and 82k are located within the third electrical power panel 62. An alternate controller 94c within the third electrical power panel 62 is configured to selectively control contactors 90i, 90j, and 90l.

The system 50 includes various diodes 96, circuit breakers 98, other contactors, and other elements to facilitate power distribution.

The alternate system portion 84 of the first electrical power panel 54 is configured to force the contactors 90a open and contactors 90b to 90c closed when the system is not operating under normal operation. The controller 94a effectively loses the ability to control the contactors 90a to 90c under abnormal operation, such as under an electrical emergency operation when the alternate power source 78 is providing power.

The alternate system portion 86 of the second electrical power panel 58 is configured to force the contactors 90d open and contactors 90e to 90g closed when the system 50 is not operating under normal operation. The controller 94b effectively loses the ability to control the contactors 90d to 90g closed when the system is not operating under normal conditions, such as emergency operation when the alternate power source 78 is providing power.

One arrangement 100 suitable for forcing the contactor 90d open during an electrical emergency operation includes a first relay 102 and a second relay 104. Closing the first relay 102 effectively decouples the controller 94b from the alternate controller 94c. The relay 102 also closes the contactors 90g and 90e coupling them to the DC emergency bus 82e. The relay 102 also closes the contactor 90f by completion of the coil return path for contactor 90f.

The second relay 104 is incorporated, in this example, to confirm that the system 50 requires alternate power. Closing the second relay 104, in this example, requires a loss in AC power and a signal from the alternate controller 94c that the system 50 requires alternate power.

The example arrangement 100 includes an alternate contactor 110 that is wired in series with the contactor 90d and prevents a battery from feeding the DC bus 82b. Also, a battery switch 112 is incorporated that may be actuated by the pilot to cut power from the battery during normal or emergency operation.

The example arrangement 100 also includes contactors 120 that are not influenced by the position of the first relay 102.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

We claim:

1. A power distribution system comprising:
   a main source of power;
   an alternate source of power, the main source and alternate source selectively powering the power distribution system;
   a controller operably engaged with at least one contactor when the main source is powering the power distribution system such that the controller can selectively open and close at least one contactor; and
   a relay moveable to a position that holds at least one contactor closed and operably disengages the controller from selectively opening and closing the at least one contactor, wherein the relay is moved to the position in response to the alternate source powering the power distribution system rather than the main source powering the power distribution system, wherein the at least one contactor is separate from the relay.

2. The power distribution system of claim 1, wherein the relay permits the at least one contactor to selectively open and close when the main source is powering to the power distribution system, and the relay does not permit the at least one contactor to open when the alternate supply is powering the power distribution system.

3. The power distribution system of claim 1, wherein the at least one contactor receives power exclusively from the main source or exclusively from the alternate source.

4. The power distribution system of claim 3, wherein the power moves from the at least one contactor to at least one bus.

5. The power distribution system of claim 1, wherein the main source provides power during normal operation and the alternate source provides power during abnormal operation.

6. The power distribution system of claim 1, wherein the position is an open position of the relay.

7. The power distribution system of claim 1, wherein the relay is closed when the main source provides power and opened when the alternate source provides power.

8. The power distribution system of claim 1, wherein the main source comprises a main gas turbine engine of an aircraft.

9. The power distribution system of claim 1, wherein the alternate power source comprises a ram air turbine of an aircraft.

10. The power distribution system of claim 1, further comprising:
    a plurality of power buses within the power distribution system that are configured to selectively receive power from the main source or the alternate source,
    wherein the controller is a primary controller configured to move the at least one contactor from an open position to a closed position, and from the closed position to the open position when at least one of the plurality of power buses receives power from the main power source, wherein alternatively the at least one contactor is held in the closed position when at least one of the plurality of power buses receives power from the alternate power source.

11. The power distribution system of claim 10, wherein the at least one power bus is selectively powered exclusively by the main source or the alternate source.

12. The power distribution system of claim 1, wherein the relay holds the at least one contactor closed by completion of a coil return path for the at least one contactor.

13. A power distribution system comprising:
a main source of power;
an alternate source of power;
a bus;
at least one contactor;
a controller; and
a relay separate from the at least one contactor, the relay configured to transition from a first position to a second position and from the second position to the first position, the controller and the at least one contactor operably coupled when the relay is in the first position such that the at least one contactor configured to move to an open position in response to a command from the controller when the relay is in the first position and further configured to move to a closed position in response to a command from the controller when the relay is in the first position, the controller and the at least one contactor operably decoupled when the relay is in the second position such that the controller is unable to move the at least one contactor from the closed position in response to a command from the controller when the relay is in the second position, the at least one contactor held in the closed position in response to the relay being in the second position.

14. The power distribution system of claim 13, wherein the relay transitions from the first position to the second position in response to the alternate source powering the bus rather than the main source powering the bus.

* * * * *